Patented Jan. 26, 1943

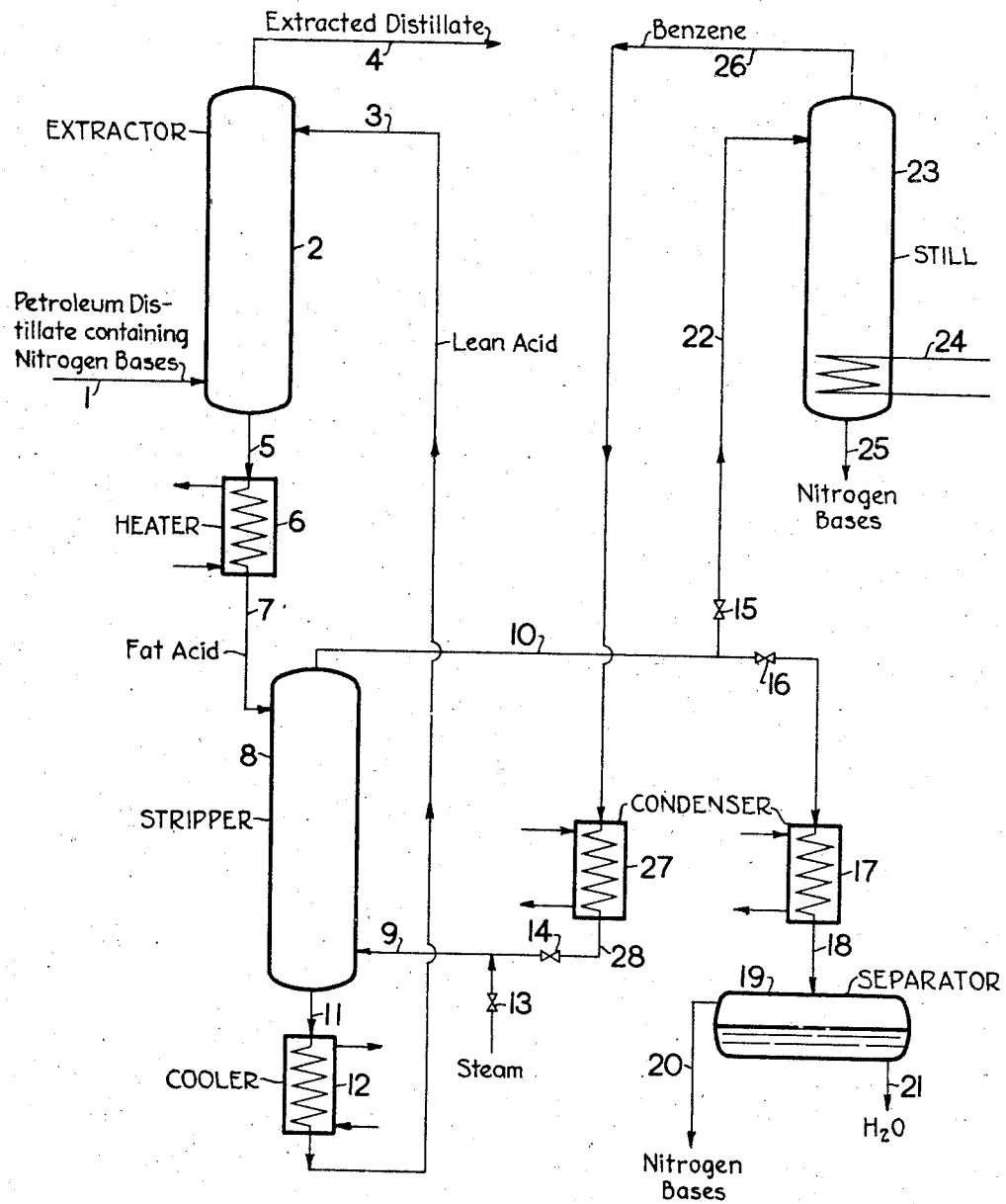

2,309,324

UNITED STATES PATENT OFFICE 2,309,324

RECOVERY OF NITROGEN BASES

Sumner H. McAllister, Lafayette, and Seaver A. Ballard, Berkeley, Calif., assignors to Shell Development Company, San Francisco, Calif., a corporation of Delaware Application February 23, 1940, Serial No. 320,444

10 Claims. (Cl. 260—290)

This invention relates to a process for removing nitrogen bases from water-insoluble organic solvents, mineral oil, hydrocarbon fractions, etc.

It has long been known that nitrogen bases can be extracted from hydrocarbons and the like by employing extracting agents such as strong mineral acids, e. g., sulfuric acid, hydrochloric acid, etc. The nitrogen bases combine with the acids to form sulfates, chlorides, etc., as the case may be. In order to recover the bases it is necessary to displace them from their salts by treating with stronger bases such as sodium hydroxide, calcium hydroxide, etc., whereby the nitrogen bases are liberated and may be separated by decantation, scrubbing, etc.

This process has certain disadvantages. Strong acids tend to polymerize unsaturated hydrocarbons which are frequently present in petroleum distillates, to form gums, resins, etc., and also tend to extract from the distillates constituents which because of their anti-knock properties can more advantageously be left in distillates which are intended for motor fuel. Moreover, large quantities of chemicals are consumed because the strong acids and bases cannot be regenerated conveniently from the resulting salts which are formed.

Liquid $SO_2$ has been employed to remove nitrogen bases from petroleum distillates but it suffers the disadvantage of removing at the same time aromatic constituents. Therefore, to prepare nitrogen bases by the $SO_2$ process, an additional separation from the aromatics is necessary.

It is an object of our invention to provide a process which allows the regeneration of the extracting agents for repeated use. This enables the economical use of extracting agents which are often relatively expensive. Another object is the production of nitrogen bases in a concentrated form in which they can be used for various purposes. For example the nitrogen bases produced by our process can be fractionated by simple distillation to furnish raw materials for the manufacture of dyes, wetting agents, rubber accelerators and other valuable organic chemicals. Still a further object is the removal of nitrogen bases from hydrocarbon oils for purposes of purifying them, since it is known that these substances sometimes impart harmful properties to hydrocarbon oils intended for various uses. For example, they impart an unpleasant odor to gasoline or kerosene.

Our process comprises extracting nitrogen bases from their solutions in organic water-insoluble normally fluid substances, such as hydrocarbon oils or gases, by contacting such substances with aqueous solutions of certain weak acids having dissociation constants below about $10^{-3}$ and preferably of the order of about $10^{-5}$ to $10^{-3}$ under conditions to form two fluid phases, at least one of which is liquid and comprises a fat aqueous solution containing the acid and absorbed nitrogen bases, and the other which is liquid or vaporous and consists essentially of the organic substance from which at least a portion of the nitrogen bases have been removed. The two phases are separated and the fat acid solution is then stripped with steam or other inert hot convection medium such as gaseous hydrocarbons or an organic solvent having good solvent properties for the nitrogen bases. The nitrogen bases may then be recovered from the stripping medium by fractional condensation or distillation, as the case may require.

We have discovered that aqueous solutions of certain weakly acidic substances make very satisfactory extracting agents for our process. Acids suitable in our process fall into several categories. We prefer to employ organic carboxylic acids in our process although certain inorganic acids including acid salts are suitable. The organic acids may be mono or polycarboxylic. In general substituted organic carboxylic acids are preferable since unsubstituted mono carboxylic organic acids usually have the disadvantage of forming azeotropes which boil below the boiling temperature of water and/or are too insoluble in water to make satisfactory extracting agents. Of the substituted organic acids the hydroxy carboxylic and polycarboxylic acids are in general preferable, but in many cases halogenated acids and keto acids may be employed as well. Sometimes in dealing with keto acids special precautions must be employed to avoid the decomposition of these substances. Examples of suitable hydroxy acids are lactic acid, mandelic acid, malic acid, glycollic acid, etc. Suitable polycarboxylic acids are citric, tartaric, glutaric, methyl succinic, ethyl succinic, diglycollic, etc. Suitable halogenated acids are brom-acetic, chlor-acetic, alpha-brom-propionic, alpha - chlor - propionic, beta - brom - propionic, beta-chlor-propionic acid. Keto acids which may be used are laevulinic acid, pyruvic acid and the like.

Certain organic acids which would be too strong as extracting agents if employed by themselves can still be used if they are suitably modified. For example oxalic acid may be partially neutralized with a strong base to give for example mono-sodium oxalate which is a suitable agent for our process. Certain inorganic acids may also be employed, for example, boric acid used preferably in conjunction with glycerin, phosphorous acid, or the products of partial neutralization of certain stronger acids such as mono sodium or potassium dihydrophosphate, etc. While the choice of the most suitable acid will to some extent depend on the particular organic liquid from which the nitrogen bases are to be extracted, we find in general that any acid possessing the properties enumerated may be used in our process, and of the listed acids we prefer to use glutaric, lactic and citric acids.

These acids have the common properties of good solubility in water and low solubility in liquid hydrocarbons, and their dissociation constants in aqueous solution are of the order of about $10^{-5}$ to $10^{-3}$. It is preferable that the acids shall not form azeotropes with water which boil below the boiling temperature of water to avoid losses of the acids during stripping and to prevent contamination of the liberated nitrogen bases; and moreover the acids must be sufficiently stable so as not to decompose appreciably under the conditions of extraction and stripping. The acids must be of such reactivity that they do not readily undergo polymerization, condensation, etc., i. e., their reactivities must be limited to salt formation only under the conditions of the process. We have found that acids of this strength are strong enough to efficiently extract nitrogen bases from their solutions in water-insoluble organic solvents and on the other hand are weak enough so that their salts hydrolyze with nitrogen bases at moderately elevated temperatures under the conditions of our process, to enable regeneration by stripping methods. Acids having dissociation constants of $10^{-2}$ and higher form salts with nitrogen bases which cannot normally be separated by stripping methods.

These acids are all relatively easily purified. This property is an advantage since occasionally tarry asphaltic substances and other impurities accumulate in the extracting solutions which are used over long periods of time in the regenerative extraction cycle of this invention. Moreover, these acids are such that their aqueous solutions under the conditions of our process cause little or no corrosion of many standard metals ordinarily used in equipment construction.

The amount of aqueous acid solution required in the extraction is normally above 5% of the hydrocarbon phase by volume and for economical reasons seldom exceeds about 100% by volume. Normally from 10 to 50% by volume is used depending upon the required thoroughness of removing the nitrogen bases.

The concentration of acid in the aqueous solution is preferably between about 15% by weight and 90% of saturation at the temperature of extraction. Usually it is not desirable to use a more concentrated solution because some solutions approaching saturation tend to deposit crystals of acid from solution when temperature fluctuations occur thus causing the clogging of pipes and other operating difficulties. On the other hand if the concentration of the acid is below about 10 or 15% by weight, there is danger of poor and incomplete extraction of the nitrogen bases from their solutions in the organic water-insoluble liquids.

In general we prefer to carry out the extraction at ordinary atmospheric temperatures, though it may at times be advantageous to maintain during the extraction a slightly elevated temperature to adjust the solubility relationships between the acid and water and the substance being extracted. Thus extraction temperatures between 0° and 60° C. may conveniently be employed.

Regeneration may be effected by reversing the extraction, i. e., by stripping the fat aqueous solution containing the absorbed nitrogen bases in the form of their salts with the acids, at a temperature sufficiently high to cause a substantial increase in the hydrolysis of the nitrogen base salts. Normally, it is desirable to go to temperatures of 80° C. and higher and preferably 100° C. and above, if necessary under superatmospheric pressure. The stripping may be carried out by means of a vaporous or liquid convection or stripping medium. Of the vaporous media, steam is preferred, although other substantially inert gases as air, flue gas, hydrocarbon gas, nitrogen, etc., may also be used. Suitable liquid media are those which are substantially neutral, have good solvent properties for the nitrogen bases, are substantially insoluble in water, are stable under the conditions of the stripping, and have boiling temperatures sufficiently above or below the boiling temperature of the nitrogen bases to enable their separation from the latter by simple fractional distillation. Examples are low-boiling hydrocarbons, as liquid propane, butane, pentanes, hexanes, benzene, toluene, xylenes, kerosene, gas oil; chlorinated hydrocarbons as carbon tetrachloride, chlormethane, chlorethane, chlorpropane, ethylene dichloride, trichlorethylene; alcohols, simple ethers or ketones of 5 or 6 or more carbon atoms; nitrobenzene, etc.

Our process is particularly applicable to the extraction of those nitrogen bases which are commonly associated with petroleum and/or coal tar distillates. While it is possible to extract ammonia from distillates such as coal tar fractions by our process, we prefer to apply the process to the extraction of relatively weak organic nitrogen bases such as primary, secondary and tertiary amines, pyridines, quinolines, and the like.

Organic substances which may contain nitrogen bases and which may be treated in accordance with our invention are those which are substantially neutral, are substantially insoluble in water, and are stable under the conditions of the extraction. For example, various hydrocarbon liquids, chlorinated hydrocarbon liquids, and in general all those liquids enumerated to be suitable for liquid stripping media may be extracted by our process. If the extraction is accomplished by liquid-liquid contact, which in general is preferable, the organic substances need not be vaporizable. On the other hand a vapor-liquid extraction is predicated on low boiling temperatures of the organic substance as well as of the nitrogen bases.

The attached drawing represents a flow diagram of one embodiment of our process. A petroleum distillate, containing nitrogen bases is admitted through line 1 to the bottom of extractor 2 wherein it is contacted with a lean aqueous solution of lactic acid admitted to extractor 2 through line 3. The treated hydrocarbon distillate after contact passes from the top of extractor 2 through line 4 to storage not shown. The lactic acid solution which extracts nitrogen bases in the extractor 2, thus becoming "fat," passes from the bottom of extractor 2 through line 5 to heater 6, whence it is admitted through line 7 to stripper 8.

The stripper can be operated with liquid or vapor stripping media, as explained before. If a vapor such as steam is used valves 14 and 15 are closed and valve 16 is open as is valve 13 to admit steam from a source not shown to stripper 8 via line 9. This causes vaporization of the nitrogen base leaving a lean acid solution stripped of most of the nitrogen bases. The lean acid solution passes from the bottom of stripper 8 through line 11 to cooler 12, whence it is recirculated to the top of extractor 2 through line 3. The vaporized nitrogen bases and steam pass from the top of stripper 8 through line 10 to condenser 17 and on through line 18 to separator 19 wherein the aqueous layer and nitrogen base layers separate into two liquid phases. The nitrogen base layer is withdrawn via line 20 to storage not shown and the aqueous layer may be withdrawn via line 21. This layer may be treated with a neutral inorganic salt to "salt out" further amounts of dissolved nitrogen bases or it may be employed to make steam for use in the process.

If a liquid stripping medium such as benzene is used, valves 13 and 16 are shut and valves 14 and 15 are open. In this case the extraction and stripping stages of the process are the same as when steam stripping is employed except that hot benzene is admitted to stripper 8 from line 28 through valve 14 and line 9. The temperatures in the extractor and stripper are regulated so that the hydrolysis of the nitrogen base salts is materially greater in stripper 8 than in the extractor 2. The nitrogen bases thus liberated readily dissolve in the benzene solvent and leave behind a lean aqueous acid solution. The lean solution is recirculated to extractor 2 as before through line 3. The benzene containing nitrogen bases passes from the top of stripper 8 via lines 10 and 22 to still 23 which is heated by coil 24. Benzene being more volatile than the nitrogen bases normally associated with petroleum distillates, is distilled off and passes as vapor through line 26 to condenser 27 and thence returns to stripper 8 through lines 28 and 9. The less volatile nitrogen bases are withdrawn from the bottom of still 23 via line 25 to storage not shown.

It is understood that the above description is but one embodiment of the present invention. The use of pumps, auxiliary heat exchangers, coolers, condensers, by-passes, etc., will at once be evident to those skilled in the design of extraction and rectifying equipment.

The following examples further illustrate the invention:

*Example I*

A cracked stove oil fraction of pressure distillate from California petroleum was treated in a three-stage countercurrent extractor with 20% lactic acid, using a volume ratio of cracked stove oil to lactic acid equal to 20:1. The entering cracked stove oil fraction contained 0.55 volume per cent of nitrogen bases, while the exit cracked stove oil contained only 0.055 volume per cent nitrogen bases. This corresponds to a 90% recovery of bases from the cracked stove oil. The lactic acid containing nitrogen bases was then treated with benzene at 150° C. in a second three-stage countercurrent extractor, using a volume ratio of benzene to acid equal to 2:1. The feed contained 10.1 gallons of nitrogen bases per 100 gallons of 20% lactic acid, while the extracted acid contained only 2.2 gallons of nitrogen bases per 100 gallons of 20% lactic acid. This corresponds to a 78% recovery of nitrogen bases from the lactic acid. The extracted acid was then returned to the first countercurrent extractor for further extraction purposes. The resulting fat benzene containing the nitrogen bases was fractionally distilled, separately to recover the two components.

*Example II*

Third cut cracked gasoline containing 0.25 volume per cent nitrogen bases was treated in the same manner as described in the previous example. Ninety per cent recovery of nitrogen bases from the gasoline was obtained using a three-stage extractor with a 40:1 ratio of hydrocarbon to acid. The 20% lactic acid containing nitrogen bases was then treated with superheated steam under pressure, whereupon most of the nitrogen bases were removed as a water azeotrope while the regenerated lactic acid was returned to the countercurrent extractor for further use. The azeotrope was condensed, whereupon it separated into two layers: water and nitrogen bases.

We claim as our invention:

1. In a process for removing basic components consisting of nitrogen bases from an organic substantially water-insoluble, normally fluid substance containing them, the steps of contacting said substance with an acidic aqueous solution containing a substantial amount of an acidic component which consists essentially of at least one acid having a dissociation constant below $10^{-3}$ and greater than $10^{-5}$, which acid is stable under the conditions of the process, does not form an azeotrope with water which boils below the boiling temperature of water, is substantially soluble in water and is substantially insoluble in said water-insoluble substance, under conditions to form two fluid phases, at least one of which is a liquid aqueous phase containing absorbed nitrogen bases, and the other phase consisting essentially of the contacted organic substance, separating said phases, stripping said separated aqueous phase with steam under conditions to take said nitrogen bases overhead and to leave said acidic component in the residual stripped aqueous phase, and recirculating the latter to contact further amounts of said substance.

2. In a process for removing basic components consisting of nitrogen bases from an organic substantially water-insoluble, normally fluid substance containing them, the steps of contacting said substance with an aqueous solution of lactic acid, under conditions to form two fluid phases, at least one of which is a liquid aqueous phase containing absorbed nitrogen bases, and the other phase consisting essentially of the resulting contacted organic substance, separating said phases, stripping said separated aqueous phase with steam under conditions to take said nitrogen bases overhead and to leave said lactic acid in the residual aqueous phase, and recirculating the latter to contact further amounts of said substance.

3. In a process for removing petroleum nitrogen bases from an organic substantially water-insoluble, normally fluid substance containing them, the steps of contacting said substance with an aqueous solution of glutaric acid, under conditions to form two fluid phases, at least one of which is a liquid aqueous phase containing absorbed nitrogen bases, and the other phase consisting essentially of the contacted organic substance, separating said phases, stripping said separated aqueous phase with steam under conditions to take said nitrogen bases overhead and to leave said glutaric acid in the residual aqueous phase, and recirculating the latter to contact further amounts of said substance.

4. In a process for removing basic components consisting of nitrogen bases from an organic substantially water-insoluble, normally fluid substance containing them, the steps of contacting said substance with an aqueous solution of citric acid, under conditions to form two fluid phases, at least one of which is a liquid aqueous phase containing absorbed nitrogen bases, and the other phase consisting essentially of the contacted organic substance, separating said phases, stripping said separated aqueous phase with steam under conditions to take said nitrogen bases overhead and to leave said citric acid in the residual aqueous phase, and recirculating the latter to contact further amounts of said substance.

5. In a process for removing basic components consisting of petroleum nitrogen bases from a mineral oil containing them, the steps of contacting said mineral oil with an acidic aqueous solution containing a substantial amount of an acidic component which consists essentially of at least one acid having a dissociation constant below $10^{-3}$ and greater than $10^{-5}$, which acid is stable under the conditions of the process, does not form an azeotrope with water which boils below the boiling temperature of water, is substantially soluble in water and is substantially insoluble in said mineral oil, under conditions to form two fluid phases, at least one of which is a liquid aqueous phase containing absorbed nitrogen bases, and the other phase consisting essentially of the contacted mineral oil, separating said phases, stripping said separated aqueous phase with steam under conditions to take said nitrogen bases overhead and to leave said acidic component in the residual aqueous phase, and recirculating the latter to contact further amounts of said mineral oil.

6. The process of claim 1 wherein said nitrogen bases are organic nitrogen bases.

7. The process of claim 1 wherein the acid in said solution has a concentration from about 15% by weight to 90% saturation under the conditions of said contact.

8. The process of claim 1 wherein the organic substance is contacted with from 5% to 100% of its own volume of the aqueous acid solution.

9. The process of claim 1 wherein the acid is a hydroxy carboxylic acid.

10. The process of claim 1 wherein the acid is a polycarboxylic acid.

SUMNER H. McALLISTER.
SEAVER A. BALLARD.